US012482297B2

(12) United States Patent
Tanida et al.

(10) Patent No.: US 12,482,297 B2
(45) Date of Patent: Nov. 25, 2025

(54) COMPUTER-READABLE RECORDING MEDIUM STORING INFORMATION PROCESSING PROGRAM, INFORMATION PROCESSING METHOD, AND INFORMATION PROCESSING APPARATUS

(71) Applicant: Fujitsu Limited, Kawasaki (JP)

(72) Inventors: Hideo Tanida, Kawasaki (JP); Taro Togawa, Kawasaki (JP); Katsuhisa Nakazato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/669,676

(22) Filed: May 21, 2024

(65) Prior Publication Data

US 2024/0412559 A1 Dec. 12, 2024

(30) Foreign Application Priority Data

Jun. 7, 2023 (JP) .................................. 2023-094416

(51) Int. Cl.
*G06V 40/20* (2022.01)
*G06Q 30/0601* (2023.01)
*G06V 10/25* (2022.01)
*G06V 20/52* (2022.01)

(52) U.S. Cl.
CPC ......... *G06V 40/20* (2022.01); *G06Q 30/0641* (2013.01); *G06V 10/25* (2022.01); *G06V 20/52* (2022.01)

(58) Field of Classification Search
None
See application file for complete search history.

(56) References Cited

U.S. PATENT DOCUMENTS

| | | | |
|---|---|---|---|
| 8,947,515 B2 * | 2/2015 | Hyde | H04N 7/18 348/78 |
| 2011/0309136 A1 * | 12/2011 | Katsakhyan | G10H 1/26 235/375 |
| 2016/0343054 A1 * | 11/2016 | Chu | G06Q 30/0627 |

(Continued)

FOREIGN PATENT DOCUMENTS

JP 2022-165483 11/2022

OTHER PUBLICATIONS

Extended European Search Report (EESR) mailed on Jun. 25, 2024 for corresponding European Patent Application No. 24178204.4 [10 pages].

*Primary Examiner* — Talha M Nawaz
(74) *Attorney, Agent, or Firm* — Fujitsu Intellectual Property Center

(57) ABSTRACT

A non-transitory computer-readable recording medium storing an information processing program for causing a computer to execute a process including: acquiring a video obtained by capturing an inside of a store; identifying a first action of a person on a commodity disposed within the store by analyzing the acquired video; generating a content by inputting the video to a machine learning model; outputting the generated content to a terminal disposed within the store; identifying a second action of the person on the commodity by analyzing a video after the content is output to the terminal; and retraining the machine learning model, based on a transition from the first action to the second action, the generated content, and an image of the commodity as a target of the identified second action.

6 Claims, 13 Drawing Sheets

(56) References Cited

U.S. PATENT DOCUMENTS

| | | |
|---|---|---|
| 2017/0011260 A1 | 1/2017 | Mihara et al. |
| 2017/0323376 A1 | 11/2017 | Glaser et al. |
| 2020/0118400 A1 | 4/2020 | Zalewski et al. |
| 2020/0184270 A1* | 6/2020 | Omer .................... G06V 20/52 |
| 2021/0279987 A1* | 9/2021 | Koo ................... G06Q 30/0281 |
| 2022/0198886 A1* | 6/2022 | Subramanian ... G08B 13/19613 |
| 2024/0414429 A1* | 12/2024 | Tomosada .............. G06V 40/10 |

* cited by examiner

FIG. 8

| MODEL IDENTIFICATION INFORMATION | RELATION | MACHINE LEARNING MODEL |
|---|---|---|
| M30a | WATCHING | DATA OF MACHINE LEARNING MODEL 30a CORRESPONDING TO MODEL IDENTIFICATION INFORMATION "M30a" |
| M30b | TOUCHING | DATA OF MACHINE LEARNING MODEL 30b CORRESPONDING TO MODEL IDENTIFICATION INFORMATION "M30b" |
| M30c | HOLDING | DATA OF MACHINE LEARNING MODEL 30c CORRESPONDING TO MODEL IDENTIFICATION INFORMATION "M30c" |
| ... | ... | ... |

| DISPLAY DEVICE IDENTIFICATION INFORMATION | POSITION | CAMERA IDENTIFICATION INFORMATION |
|---|---|---|
| A15a | $(x_1, y_1)$ | C10a |
| A15b | $(x_2, y_2)$ | C10b |
| A15c | $(x_3, y_3)$ | C10c |
| ... | ... | ... |

FIG. 10

| ITEM NUMBER | TRANSITION |
| --- | --- |
| (1) | FIRST RELATION "WATCHING" → SECOND RELATION "HOLDING" |
| (2) | FIRST RELATION "WATCHING" → SECOND RELATION "TOUCHING" |
| (3) | FIRST RELATION "TOUCHING" → SECOND RELATION "HOLDING" |
| ... | ... |

COMPUTER-READABLE RECORDING MEDIUM STORING INFORMATION PROCESSING PROGRAM, INFORMATION PROCESSING METHOD, AND INFORMATION PROCESSING APPARATUS

CROSS-REFERENCE TO RELATED APPLICATION

This application is based upon and claims the benefit of priority of the prior Japanese Patent Application No. 2023-94416, filed on Jun. 7, 2023, the entire contents of which are incorporated herein by reference.

FIELD

The embodiment discussed herein is related to a computer-readable recording medium storing an information processing program, and the like.

BACKGROUND

Various measures have been made in sales stores such that customers purchase a larger number of commodities. For example, information on a commodity set in advance is displayed on an accounting machine or the like, and a sales staff serves customers.

Examples of the related art include Japanese Laid-open Patent Publication No. 2022-165483.

SUMMARY

According to an aspect of the embodiments, there is provided a non-transitory computer-readable recording medium storing an information processing program for causing a computer to execute processing including: acquiring a video obtained by capturing an inside of a store; identifying a first action of a person on a commodity disposed within the store by analyzing the acquired video; generating a content by inputting the video to a machine learning model; outputting the generated content to a terminal disposed within the store; identifying a second action of the person on the commodity by analyzing a video after the content is output to the terminal; and retraining the machine learning model, based on a transition from the first action to the second action, the generated content, and an image of the commodity as a target of the identified second action.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an example of a data structure of a model table according to the present embodiment;

FIG. 9 is a diagram illustrating an example of a data structure of a display device management table according to the present embodiment;

FIG. 10 is a diagram illustrating an example of a data structure of a transition definition table according to the present embodiment;

DESCRIPTION OF EMBODIMENTS

As described above, it is difficult to increase a customer's willingness to purchase simply by displaying the information on the commodity. By contrast, in a case where the customer is interested in a certain commodity, when information on the commodity effective for the customer is presented, the customer's willingness to purchase the commodity may be increased.

Thus, it is desirable to generate a machine learning model capable of obtaining the information on the commodity effective for the customer.

According to one aspect, an object of the present disclosure is to provide an information processing program, an information processing method, and an information processing apparatus capable of obtaining a machine learning model capable of generating information on a commodity effective for a customer.

Hereinafter, an embodiment of an information processing program, an information processing method, and an information processing apparatus disclosed in the present application will be described in detail based on the drawings. This disclosure is not limited by this embodiment.

EMBODIMENT

Figure 1:
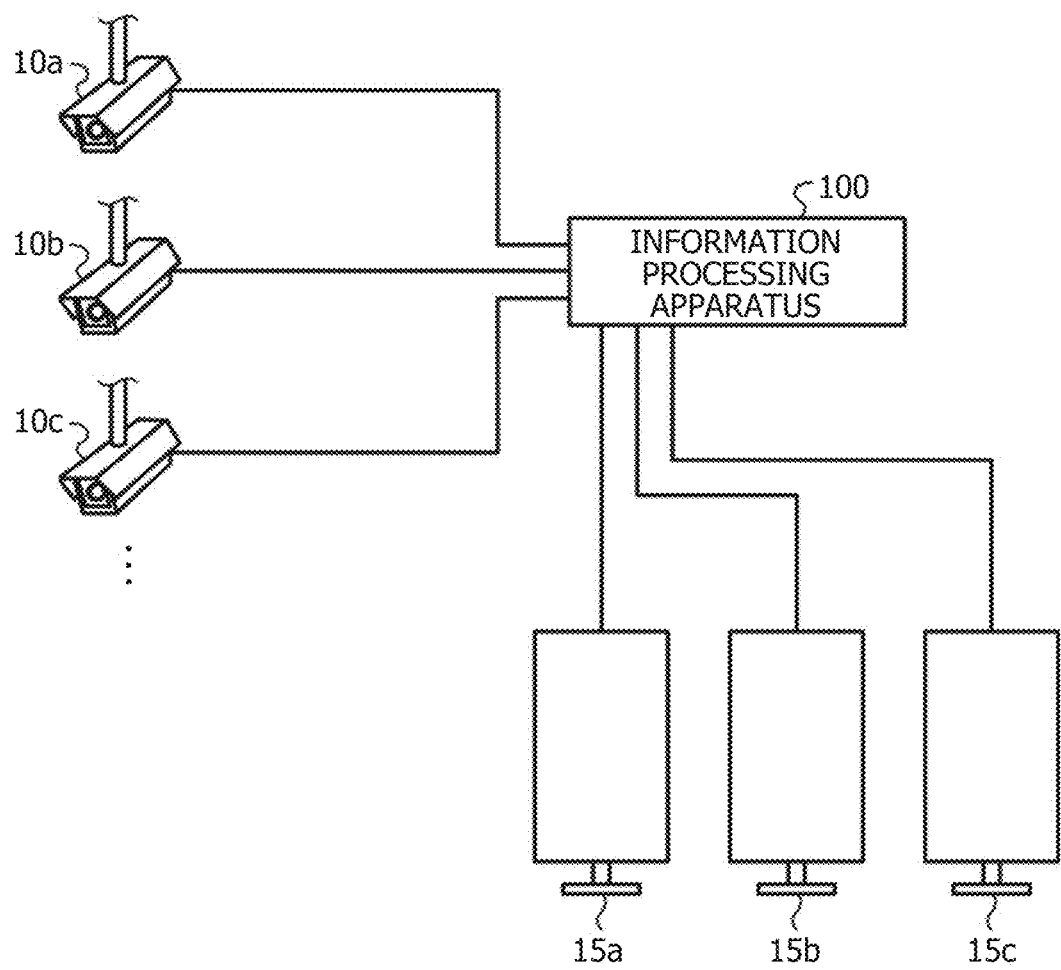
FIG. 1 is a diagram illustrating an example of a system according to the present embodiment.

A system according to the present embodiment will be described. FIG. 1 is a diagram illustrating an example of the system according to the present embodiment. As illustrated in FIG. 1, this system includes cameras 10a, 10b, and 10c, display devices 15a, 15b, and 15c, and an information processing apparatus 100. The cameras 10a to 10c and the information processing apparatus 100 are coupled to each other via a network. The display devices 15a to 15c and the information processing apparatus 100 are coupled to each other via a network.

Although only the cameras 10a to 10c and the display devices 15a to 15c are illustrated in FIG. 1 for the sake of convenience in description, the system according to the present embodiment may include other cameras and other display devices.

The cameras 10a to 10c are installed at predetermined positions within a store. A plurality of commodities are disposed within the store. It is assumed that the cameras 10a to 10c are installed at different positions (coordinates), respectively. In the following description, in a case where the cameras 10a to 10c are not distinguished, the cameras 10a to 10c are referred to as "cameras 10".

Each of the cameras 10 captures a video of an inside of the store and transmits data of the captured video to the information processing apparatus 100. In the following description, the data of the video transmitted by the camera 10 to the information processing apparatus 100 is referred to as "video data".

The video data includes a plurality of time-series image frames. Frame numbers are assigned to the image frames in ascending chronological order. One image frame is a still image captured by the camera 10 at a certain timing. Data of time may be given to each image frame. Camera identification information for identifying the camera 10 that has captured the video data is set in the video data.

The display devices 15a to 15c are installed at predetermined positions within the store, for example, installed around the commodities. It is assumed that the display devices 15a to 15c are installed at different positions (coordinates), respectively. In the following description, in a case where the display devices 15a to 15c are not distinguished, the display devices 15a to 15c are referred to as "display devices 15". Each of the display devices 15 displays information on the commodity and the like output from the information processing apparatus 100.

The information processing apparatus 100 specifies a first region including a customer as a target who purchases a commodity within the store, a second region including the commodity, and a relation that identifies an interaction between the customer and the commodity, by acquiring the video data of the inside of the store from the cameras 10 and analyzing the acquired video data. For example, the relation includes "watching", "touching", "sitting", "holding", and the like. The relation that identifies the interaction between the customer and the commodity corresponds to "an action of a person on the commodity".

Based on the specified relation, the information processing apparatus 100 selects a machine learning model from among a plurality of machine learning models stored in a storage unit. Each machine learning model is a trained machine learning model, and is a model that outputs advertisement information of the commodity in a case where an image of the second region including the commodity is input. The machine learning model is a neural network (NN) or the like. In the following description, the selected machine learning model is referred to as a "selected learning model" as appropriate. The advertisement information of the commodity output from the selected learning model is referred to as a "content".

The information processing apparatus 100 inputs the image of the second region including the commodity of the video data (image frame) to the selected learning model to generate the content, and outputs the generated content to the display device 15 to display the generated content.

After the content is output to the display device 15, the information processing apparatus 100 specifies the first region including the customer as the target, the second region including the commodity, and the relation that identifies the interaction between the customer and the commodity, by acquiring the video data obtained by capturing the image of the customer as the target from the camera 10 and analyzing the acquired video data. The relation that identifies the interaction between the customer and the commodity before the content is output to the display device 15 is referred to as a "first relation". By contrast, the relation that identifies the interaction between the customer and the commodity after the content is output to the display device 15 is referred to as a "second relation".

For example, in a case where a transition from the first relation to the second relation corresponds to a transition defined in advance, the information processing apparatus 100 generates training data using, as input data, the image of the second region including the commodity of the video data (image data) and using, as a ground truth label, the content output from the selected learning model, and registers the training data in a training data table. In a case where the transition from the first relation to the second relation does not correspond to the transition defined in advance, the information processing apparatus 100 skips processing of generating the training data.

For example, in a case where the transition is made from the first relation "watching" to the second relation "holding", it may be said that the customer as the target is interested in the commodity as a result of referring to the content displayed on the display device 15, and it may be said that information on the commodity effective for the customer may be provided. For example, the content output when the image of the second region including the commodity is input to the selected learning model that corresponds to the first relation is an appropriate content for increasing the customer's willingness to purchase.

The above-described processing is repeatedly executed, and thus, the information processing apparatus 100 registers a set (training data) of the input data and the ground truth label in the training data table. The information processing apparatus 100 retrains the selected learning model, based on the input data and the ground truth label registered in the training data table. For example, the information processing apparatus 100 retrains the selected learning model by using back propagation (error back propagation method). Accordingly, the machine learning model capable of generating the information on the commodity effective for the customer may be obtained.

Figure 2:
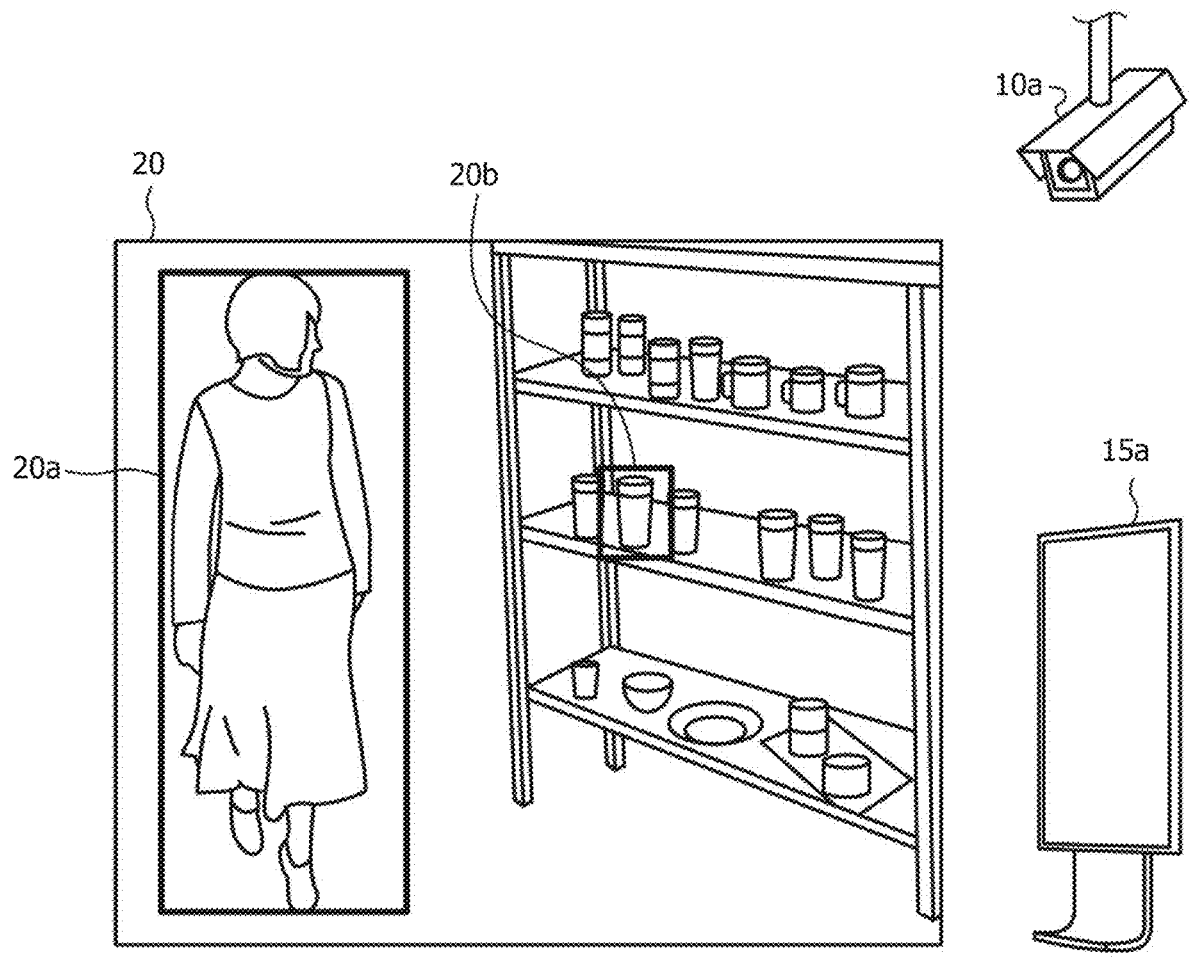
FIG. 2 is a diagram (part 1) for describing processing of an information processing apparatus according to the present embodiment.
Figure 3:
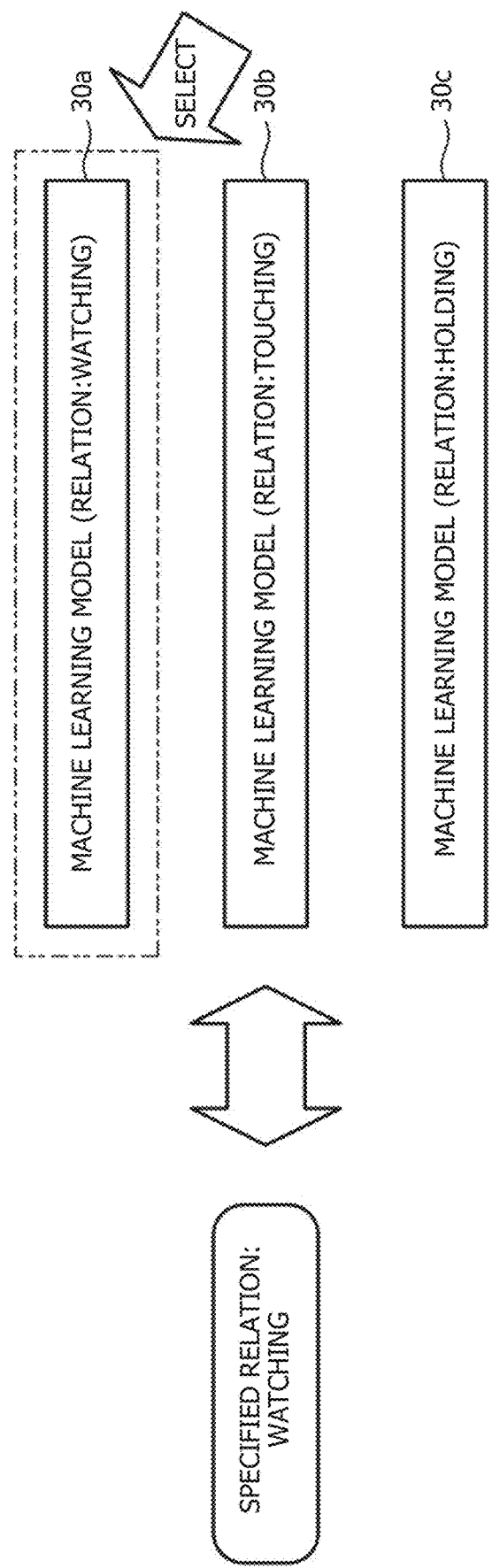
FIG. 3 is a diagram (part 2) for describing the processing of the information processing apparatus according to the present embodiment.
Figure 4:
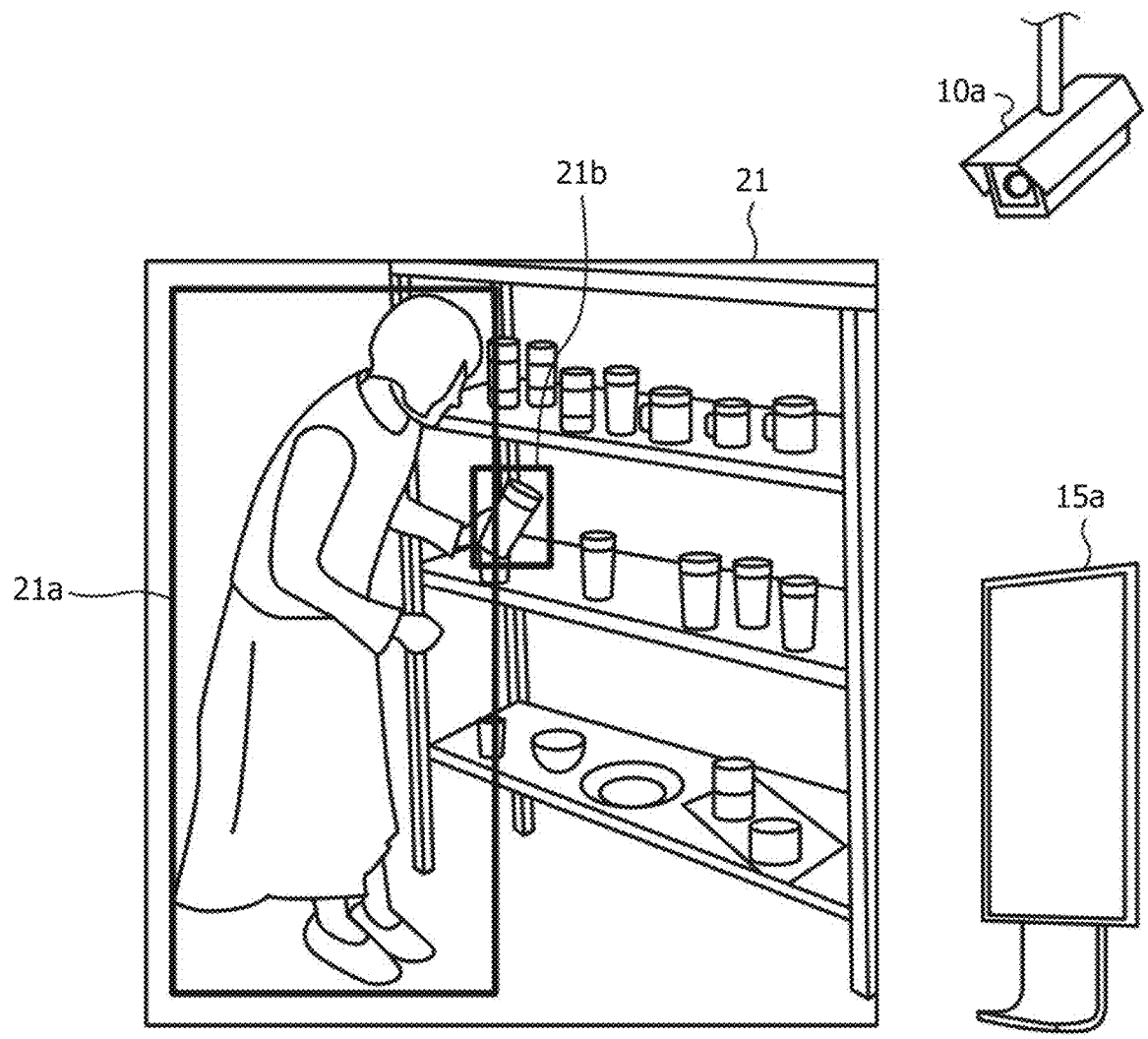
FIG. 4 is a diagram (part 3) for describing the processing of the information processing apparatus according to the present embodiment.

FIGS. 2, 3, and 4 are diagrams for describing processing of the information processing apparatus according to the present embodiment. First, description will be made for FIG. 2. For example, the information processing apparatus 100 specifies a first region 20a including a customer, a second region 20b including a commodity, and a relation (first relation) between the customer and the commodity by analyzing video data (image frame) 20 captured by the camera 10a. It is assumed that in the example illustrated in FIG. 2, the first relation is "watching". The display device 15a is installed near the commodity included in the second region 20b. It is assumed that the display device 15a is a display device closest to the camera 10a among the plurality of display devices 15.

Description continues with reference to FIG. 3. The information processing apparatus 100 includes a plurality of machine learning models. FIG. 3 illustrates machine learning models 30a, 30b, and 30c. For example, the machine learning model 30a is a machine learning model dedicated to the relation "watching". The machine learning model 30b is a machine learning model dedicated to the relation "touching". The machine learning model 30c is a machine learning model dedicated to the relation "holding". Each of the machine learning models 30a to 30c is a neural network (NN) or the like.

The machine learning model 30a is trained in advance by a plurality of pieces of first training data corresponding to the relation "watching". For example, input of the first training data is image data of the commodity, and output (ground truth label) is commodity information. The commodity information of the first training data is "advertisement information of commodity" or the like.

The machine learning model 30b is trained in advance by using a plurality of pieces of second training data corresponding to the relation "touching". For example, input of the second training data is image data of the commodity, and output (ground truth label) is commodity information. The commodity information of the second training data includes "information describing an advantage of the commodity", "information describing popularity of the commodity", and the like.

The machine learning model 30c is trained in advance by a plurality of pieces of third training data corresponding to the relation "holding". For example, input of the third training data corresponding to the relation "holding" is image data of the commodity, and output (ground truth label) is commodity information. The commodity information of the third training data is "information describing privilege obtained when commodity is purchased" or the like.

The information processing apparatus 100 selects a machine learning model that corresponds to the first relation specified by the processing described in FIG. 2 from among the machine learning models 30a to 30c. For example, in a case where the specified relation is "watching", the information processing apparatus 100 selects the machine learning model 30a in FIG. 3 as the selected learning model.

The information processing apparatus 100 generates the commodity information (content) of the commodity included in the second region 20b by inputting the image data of the second region 20b including the commodity to the machine learning model 30a. The information processing apparatus 100 outputs and displays the generated content to and on the display device 15a disposed near the commodity included in the second region 20b, and causes the customer to refer to the content.

Description continues with reference to FIG. 4. After the content is output and displayed to and on the display device 15a, the information processing apparatus 100 specifies a first region 21a including the customer, a second region 21b including the commodity, and a relation (second relation) between the customer and the commodity by analyzing video data (image frame) 21 captured by the camera 10a. It is assumed that in the example illustrated in FIG. 4, the second relation is "holding".

In a case where the transition from the first relation "watching" to the second relation "holding" is a transition of a relation set in advance, the information processing apparatus 100 executes the following processing. The transition of the relation set in advance is a transition in which the transition from the first relation to the second relation is closer to a purchase action of the commodity.

The information processing apparatus 100 generates first training data using, as input data, the image of the commodity in the second region 20b illustrated in FIG. 2 and using, as the ground truth label, the content output when the image of the commodity in the second region 20b is input to the machine learning model 30a, and registers the first training data in a first training data table for the machine learning model 30a.

Although a case where the information processing apparatus 100 selects the machine learning model 30a as the selected learning model has been described with reference to FIGS. 2 to 4, similar processing is executed even in a case where the machine learning model 30b or 30c is selected. A table that stores the second training data for the machine learning model 30b is referred to as a second training data table. A table that stores the third training data for the machine learning model 30c is referred to as a third training data table. In the following description, the first training data, the second training data, and the third training data are collectively referred to as training data as appropriate. The first training data table, the second training data table, and the third training data table are collectively referred to as a training data table.

The above-described processing is repeatedly executed, and thus, the information processing apparatus 100 registers a set (training data) of the input data and the ground truth label in the training data table corresponding to the selected learning model. The information processing apparatus 100 retrains the selected learning model, based on the input data and the ground truth label registered in the training data table. Accordingly, the machine learning model capable of generating the content effective for the customer may be obtained.

The information processing apparatus 100 specifies the first region including the customer, the second region including the commodity, and the relation between the first region and the second region by using HOID. The information processing apparatus 100 inputs the video data (time-series image frames) to the HOID, so that information on the first region, the second region, and the relation are output.

An example of learning processing of the HOID executed by the information processing apparatus 100 will be described. The information processing apparatus 100 trains the HOID for identifying a first class indicating a person, a second class indicating an object, and a relation between the first class and the second class by using a plurality of pieces of training data.

Each piece of training data includes image data (image frame) as input data and ground truth information set for this image data.

Classes of human and a thing as detection targets, a class indicating an interaction between the human and the thing, and a bounding box (Bbox) indicating a region of each class are set as the ground truth information. For example, region information of a something class indicating the object, region information of a human class indicating a user, and a relation indicating an interaction between the something class and the human class are set as the ground truth information.

A plurality of classes and a plurality of interactions may be set for the training data, and the trained HOID may recognize the plurality of classes and the plurality of interactions.

When the something class is created by normal object recognition, all objects unrelated to a task, such as all of the background, clothing items, and small objects, are detected. Since all of these objects are something, a large number of Bboxes are merely recognized within the image data, and nothing is known. Since a special relation of human to a thing (other relations such as holding, sitting, and operating in some cases) is recognized in the case of the HOID, such a relation may be used as meaningful information for a task.

Figure 5:
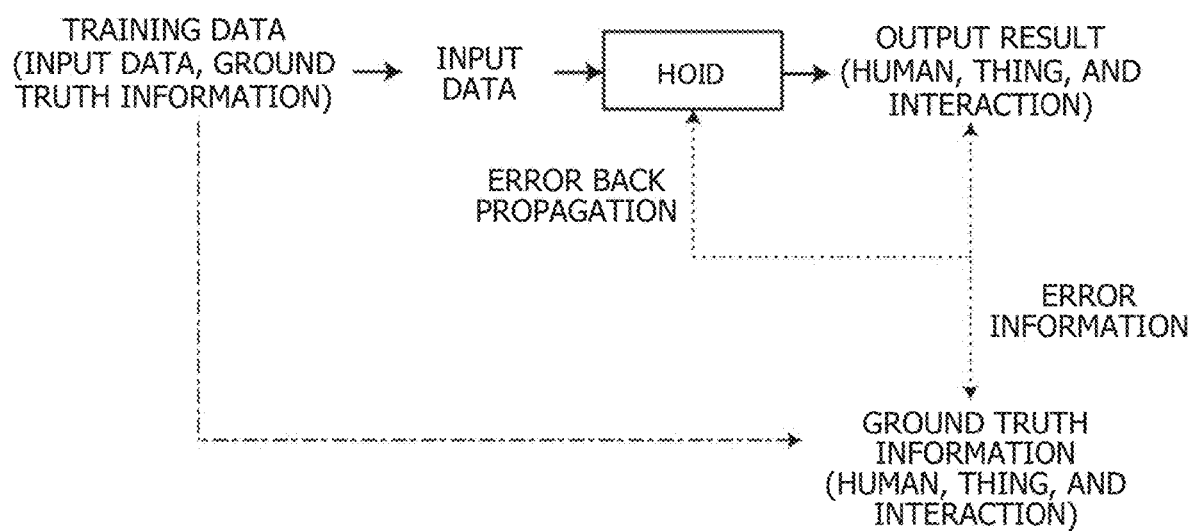
FIG. 5 is a diagram for describing machine learning of Human Object Interaction Detection (HOID)

FIG. 5 is a diagram for describing machine learning of the HOID. As illustrated in FIG. 5, the information processing apparatus 100 inputs the input data of the training data to the HOID, and acquires an output result of the HOID. This output result includes the class of the human, the class of the thing, the interaction between the human and the thing, and the like detected by the HOID. The information processing apparatus 100 calculates error information between the ground truth information of the training data and the output result of the HOID, and executes machine learning of the HOID by error back propagation to reduce an error.

Next, an example of identification processing using the HOID will be described. The information processing apparatus 100 inputs each image frame of the video data captured by the camera 10 to the HOID, and acquires the output result of the HOID. The output result of the HOID includes a Bbox of the human, a Bbox of the thing, a probability value of the interaction between the human and the thing (probability value of each relation), a class name, and the like. The Bbox of the human corresponds to the above-described first region. The Bbox of the thing corresponds to the above-described second region. The information processing apparatus 100 specifies the relation based on the output result of the HOID. For example, the information processing apparatus 100 specifies a relation having a maximum probability value as the relation between the first region and the second region.

As described above, the information processing apparatus 100 may specify the first region, the second region, and the relation by inputting the video data to the HOID. Alternatively, the information processing apparatus 100 may retain the HOID trained by machine learning in the storage unit in advance, and may specify the first region, the second region, and the relation by using this HOID.

In a case where the first region, the second region, and the relation are specified, the information processing apparatus 100 may use a technique other than HOID. For example, the information processing apparatus 100 may detect objects including a person by using an existing detection algorithm, may estimate a relation between the individual objects, and may generate a scene graph representing the individual objects and the relation between those objects, for example, a context. The existing detection algorithm includes, for example, YOU Only Look Once (YOLO), Single Shot Multibox Detector (SSD), Region Based Convolutional Neural Networks (RCNN), and the like.

Figure 6:
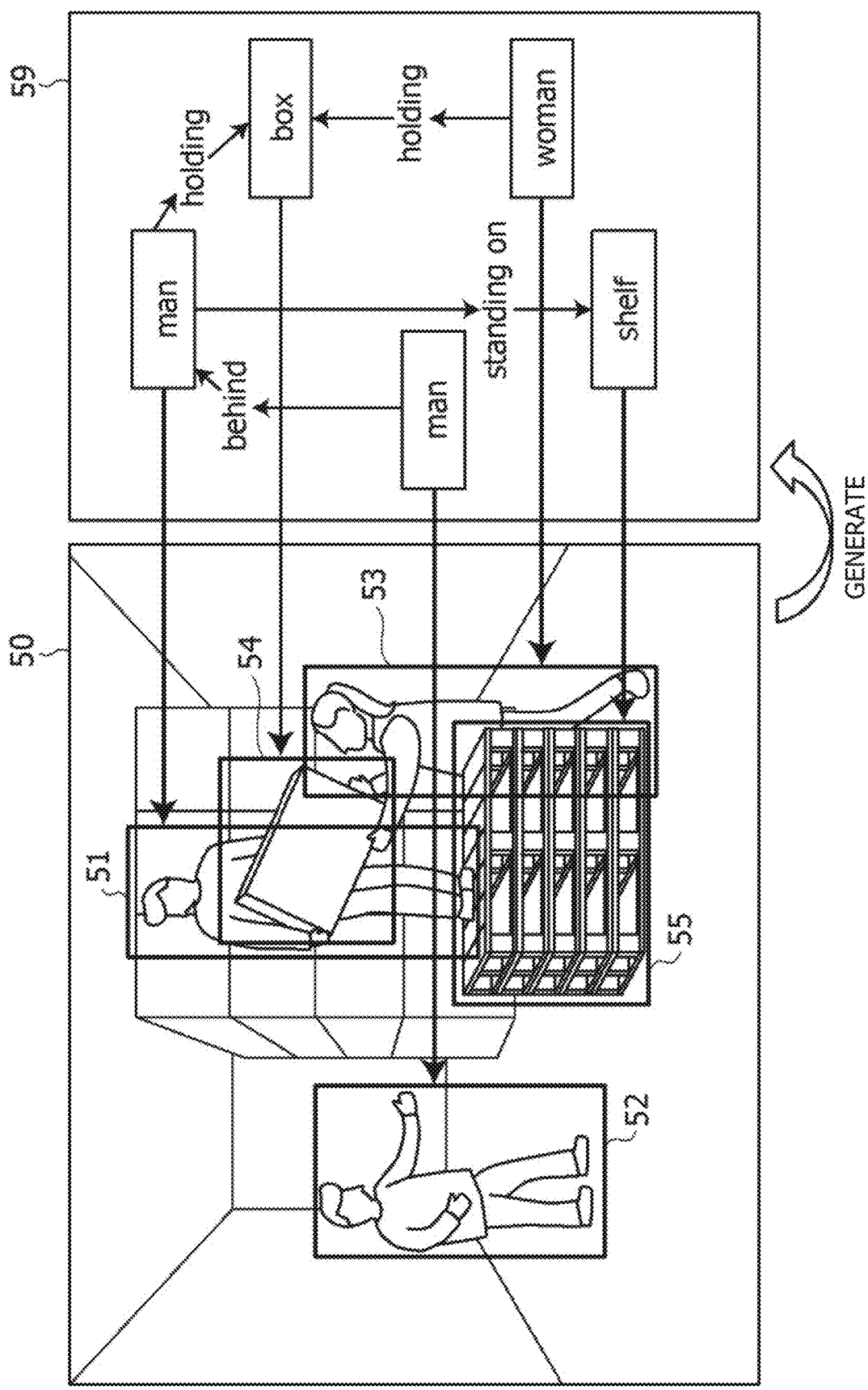
FIG. 6 is a diagram illustrating an example of relation specification using a scene graph.

FIG. 6 is a diagram illustrating an example of the relation specification using the scene graph. In the example illustrated in FIG. 6, at least two men indicated by Bboxes 51 and 52, a woman indicated by a Bbox 53, a box indicated by a Bbox 54, and a shelf indicated by a Bbox 55 are detected from an image frame 50. The information processing apparatus 100 cuts out the Bbox region of each object from the image frame 50, extracts a feature of each region, estimates, from the features of each pair of objects (subject and object), a relation between the individual objects, and generates a scene graph 59. In FIG. 6, the scene graph 59 represents a relation in which the man indicated by the Bbox 51 is standing on the shelf indicated by the Bbox 55. The relation of the man indicated by the Bbox 51 represented by the scene graph 59 is not limited to one. As illustrated in FIG. 6, the scene graph 59 represents all estimated relations such as being present behind the man indicated by the Bbox 52 and holding the box indicated by the Bbox 54, in addition to the shelf. As described above, the information processing apparatus 100 may specify the relation between the object included in the video (image frame) and the person by generating the scene graph.

Figure 7:
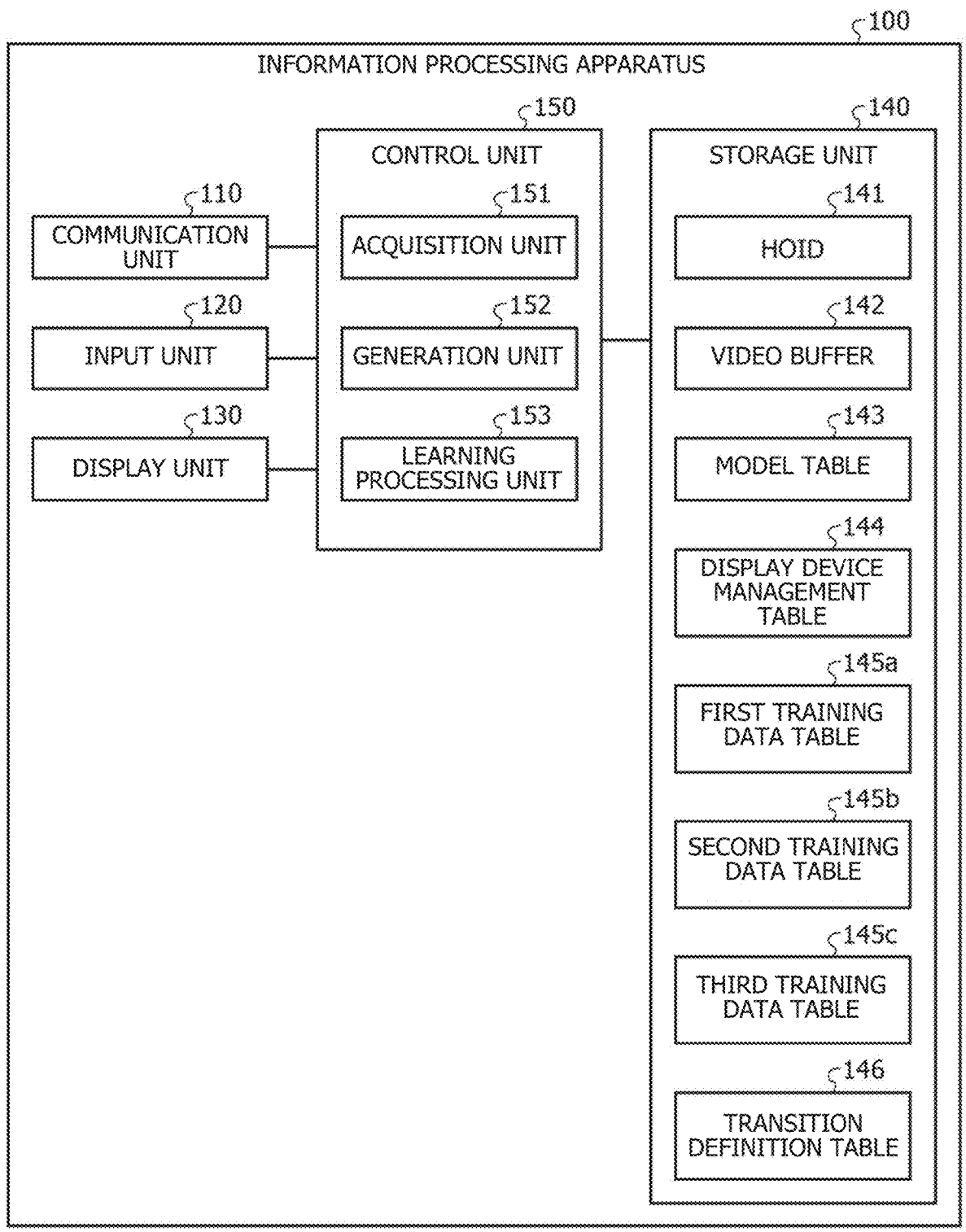
FIG. 7 is a functional block diagram illustrating a configuration of the information processing apparatus according to the present embodiment.

Next, a configuration example of the information processing apparatus 100 that executes the processing described in FIGS. 2 to 4 will be described. FIG. 7 is a functional block diagram illustrating a configuration of the information processing apparatus according to the present embodiment. As illustrated in FIG. 7, this information processing apparatus 100 includes a communication unit 110, an input unit 120, a display unit 130, a storage unit 140, and a control unit 150.

The communication unit 110 executes data communication with the camera 10, the display device 15, an external device, and the like via a network. The communication unit 110 is a network interface card (NIC) or the like. For example, the communication unit 110 receives the video data from the camera 10.

The input unit 120 is an input device that inputs various kinds of information to the control unit 150 of the information processing apparatus 100. For example, the input unit 120 corresponds to a keyboard, a mouse, a touch panel, or the like.

The display unit 130 is a display device that displays information output from the control unit 150.

The storage unit 140 includes an HOID 141, a video buffer 142, a model table 143, and a display device management table 144. The storage unit 140 includes a first training data table 145a, a second training data table 145b, a third training data table 145c, and a transition definition table 146. The storage unit 140 is a storage device such as memory.

The HOID 141 is the HOID described with in FIG. 5 and the like. By inputting the image frame of the video data to the HOID 141, the first region, the second region, and the relation between the first region (the person included in the first region) and the second region (the object included in the second region) in the image frame are output. Such a relation corresponds to the action of the person included in the first region on the object included in the second region.

The video buffer 142 retains the video data captured by the camera 10. For example, the video buffer 142 retains the video data in association with the camera identification information.

The model table 143 retains information on the plurality of machine learning models 30a to 30c described in FIG. 3. FIG. 8 is a diagram illustrating an example of a data structure of the model table according to the present embodiment. As illustrated in FIG. 8, this model table 143 associates the model identification information, the relation, and the machine learning model with one another. The model identification information is information for uniquely identifying the machine learning model. The relation indicates a relation corresponding to the machine learning model. The machine learning model is an NN in which the image data (image frame) is input and the commodity information is output.

For example, model identification information "M30a" indicates the machine learning model 30a. The machine learning model 30a is a machine learning model corresponding to the relation "watching". Model identification information "M30b" indicates the machine learning model 30b. The machine learning model 30b is a machine learning model corresponding to the relation "touching". Model identification information "M30c" indicates the machine learning model 30c. The machine learning model 30c is a machine learning model corresponding to the relation "holding".

The display device management table 144 retains information on the display devices 15 disposed within the store. FIG. 9 is a diagram illustrating an example of a data structure of the display device management table according to the present embodiment. As illustrated in FIG. 9, the display device management table 144 associates the display device identification information, the position, and the camera identification information with one another.

The display device identification information is information for uniquely identifying the display device 15. For example, it is assumed that the pieces of display device identification information of the display devices 15a, 15b, and 15c are A15a, A15b, and A15c, respectively. The position indicates the position (coordinates) of the display device 15. The camera identification information is information for identifying the camera 10 closest to the display device 15. For example, the pieces of camera identification information C10a, C10b, and C10c correspond to the cameras 10a, 10b, and 10c illustrated in FIG. 1, respectively.

For example, in FIG. 9, information is registered which indicates that the display device 15a with the display device identification information "A15a" is installed at the position "$(x_1, y_1)$" and the camera 10 closest to the display device 15a is the camera 10a with the camera identification information "C10a".

Referring back to the description in FIG. 7. The first training data table 145a retains first training data for retraining the machine learning model 30a. As will be described later, the first training data is generated by the control unit 150 and is registered in the first training data table 145a.

The second training data table 145b retains second training data for retraining the machine learning model 30b. As will be described later, the second training data is generated by the control unit 150 and is registered in the second training data table 145b.

The third training data table 145c retains third training data for retraining the machine learning model 30c. As will be described later, the third training data is generated by the control unit 150 and is registered in the third training data table 145c.

The transition definition table 146 is used in a case where it is determined whether or not to register a set of commodity image data and the content as the training data. In a case where the transition from the first relation to the second relation is a transition defined in the transition definition table 146, the control unit 150 determines that the set of the commodity image data and the content is registered as the training data.

FIG. 10 is a diagram illustrating an example of a data structure of the transition definition table according to the present embodiment. As illustrated in FIG. 10, an item number and a transition from the first relation to the second relation are set in the transition definition table 146. For example, a transition defined in an item number (1) is a transition from the first relation "watching" to the second relation "holding". A transition defined in an item number (2) is a transition from the first relation "watching" to the second relation "touching". A transition defined in an item number (3) is a transition from the first relation "touching" to the second relation "holding". For the transition from the item number (1) to the item number (3), it may be said that the customer's willingness to purchase is higher in the second relation after the transition than in the first relation before the transition. Although only the transitions of the item number (1) to the item number (3) are illustrated in FIG. 10, it is assumed that transitions of other item numbers are also defined.

The control unit 150 includes an acquisition unit 151, a generation unit 152, and a learning processing unit 153. The control unit 150 is a central processing unit (CPU), a graphics processing unit (GPU), or the like.

The acquisition unit 151 acquires the video data from the camera 10. As described above, the camera identification information of the camera 10 that has captured the video data is set for the video data. The acquisition unit 151 stores the video data (time-series image frames) in association with the camera identification information in the video buffer 142.

The generation unit 152 generates pieces of training data for retraining the machine learning models 30a to 30c, based on the video data captured by the camera 10. For example, the generation unit 152 executes first analysis processing, content generation processing, second analysis processing, and training data generation processing. Hereinafter, the first analysis processing, the content generation processing, the second analysis processing, and the training data generation processing that are executed by the generation unit 152 will be described in this order.

An example of the "first analysis processing" to be executed by the generation unit 152 will be described first. The generation unit 152 specifies the first region, the second region, and the relation by acquiring the video data from the video buffer 142 and analyzing the video data. Such a relation is a relation between "a first object included in the first region" and "a second object included in the second region". For example, the generation unit 152 inputs the time-series image frames (image data) included in the video data to the HOID 141, and specifies the first region, the second region, and the relation in each image frame.

The above-described processing is repeatedly executed, and thus, the generation unit 152 specifies the first region, the second region, and the relation for each time-series image frame. In a case where the first region, the second region, and the relation are repeatedly specified, the generation unit 152 tracks the customer included in the first region and the commodity included in the second region. The generation unit 152 generates information on the analysis result of the aforementioned processing. In the following description, the information on the analysis result is referred to as "first analysis result information". For example, in the first analysis result information, image data of the first region that includes a person being tracked, image data of the second region that includes a commodity being tracked, the first relation, and camera identification information of the camera 10 that has captured the video data (image frame) are associated with one another. In the following description, the image data of the second region including the commodity being tracked is referred to as "commodity image data".

Next, an example of the "content generation processing" executed by the generation unit 152 will be described. The generation unit 152 selects a machine learning model that corresponds to the first relation included in the first analysis result information from among the plurality of machine learning models registered in the model table 143. The generation unit 152 inputs the commodity image data to the selected machine learning model (selected learning model), and acquires the content output from the selected learning model.

For example, in a case where the relation included in the first analysis result information is "watching", the generation unit 152 selects the machine learning model 30a corresponding to "watching" as the selected learning model from the model table 143. The generation unit 152 generates the content by inputting the commodity image data to the selected machine learning model 30*a*.

The generation unit 152 selects the display device 15 positioned at a location closest to the camera 10 corresponding to the camera identification information, and outputs and displays the generated content, based on the camera identification information set in the first analysis result information and the display device identification information. For example, when the camera identification information set in the first analysis result information is "C10*a*", the display device 15 positioned at a location closest to the camera 10*a* with the camera identification information "C10*a*" is the display device 15*a* with the display device identification information "A15*a*". In this case, the generation unit 152 outputs and displays the content to and on the display device 15*a*.

Next, an example of the "second analysis processing" to be executed by the generation unit 152 will be described. For the sake of convenience in description, it is assumed that the selected learning model is the machine learning model 30*a*. It is assumed that the generation unit 152 causes the display device 15*a* installed near the camera 10*a* to display the content generated by the machine learning model 30*a* by inputting the commodity image data to the machine learning model 30*a*.

After the content is displayed on the display device 15*a*, the generation unit 152 specifies the first region, the second region, and the relation (second relation) by acquiring the video data captured by the camera 10*a* and analyzing the video data. For example, the generation unit 152 inputs the time-series image frames (image data) included in the video data to the HOID 141, and specifies the first region, the second region, and the second relation in each image frame.

The generation unit 152 generates second analysis result information based on the processing result described above. The second analysis result information includes the first relation, the second relation, the commodity image data, and the content. The above-described processing is repeatedly executed, and thus, the generation unit 152 generates a plurality of pieces of second analysis result information.

Next, an example of the "training data generation processing" executed by the generation unit 152 will be described. The generation unit 152 determines whether or not a relation between the first relation and the second relation in the second analysis result information (transition from the first relation to the second relation) is registered in the transition definition table 146. For example, the relation between the first relation "watching" and the second relation "holding" in the second analysis result information corresponds to the transition of the item number (1) in the transition definition table 146.

In a case where the relation between the first relation and the second relation in the second analysis result information is registered in the transition definition table 146, the generation unit 152 executes the following processing to generate the training data. For example, the generation unit 152 generates the training data using, as the input data, the commodity image data included in the second analysis result information and using, as the ground truth label, the content included in the second analysis result information. The generation unit 152 registers the training data in the corresponding training data table based on the first relation included in the second analysis result information.

In a case where the first relation included in the second analysis result information is "watching", the generation unit 152 registers the generated training data in the first training data table 145*a*. In a case where the first relation included in the second analysis result information is "touching", the generation unit 152 registers the generated training data in the second training data table 145*b*. In a case where the first relation included in the second analysis result information is "holding", the generation unit 152 registers the generated training data in the third training data table 145*c*.

For each piece of second analysis result information, the generation unit 152 repeatedly executes the above-described processing. In a case where the relation between the first relation and the second relation in the second analysis result information is not registered in the transition definition table 146, the generation unit 152 skips the processing of generating the training data based on the corresponding second analysis result information, and performs processing on the next second analysis result information.

As described above, the generation unit 152 generates training data by sequentially executing the first analysis processing, the content generation processing, the second analysis processing, and the training data generation processing, and registers the training data in the corresponding training data table.

The learning processing unit 153 executes retraining of each machine learning model by using back propagation based on the training data table. For example, the learning processing unit 153 retrains the machine learning model 30*a* by using the first training data registered in the first training data table 145*a*. The learning processing unit 153 updates parameters of the machine learning model 30*a* such that an error between the output result in a case where the input data of the first training data is input to the machine learning model 30*a* and the ground truth label of the first training data decreases.

The learning processing unit 153 updates parameters of the machine learning model 30*b* such that an error between the output result in a case where the input data of the second training data is input to the machine learning model 30*b* and the ground truth label of the second training data decreases.

The learning processing unit 153 updates parameters of the machine learning model 30*c* such that an error between the output result in a case where the input data of the third training data is input to the machine learning model 30*c* and the ground truth label of the third training data decreases.

Figure 11:
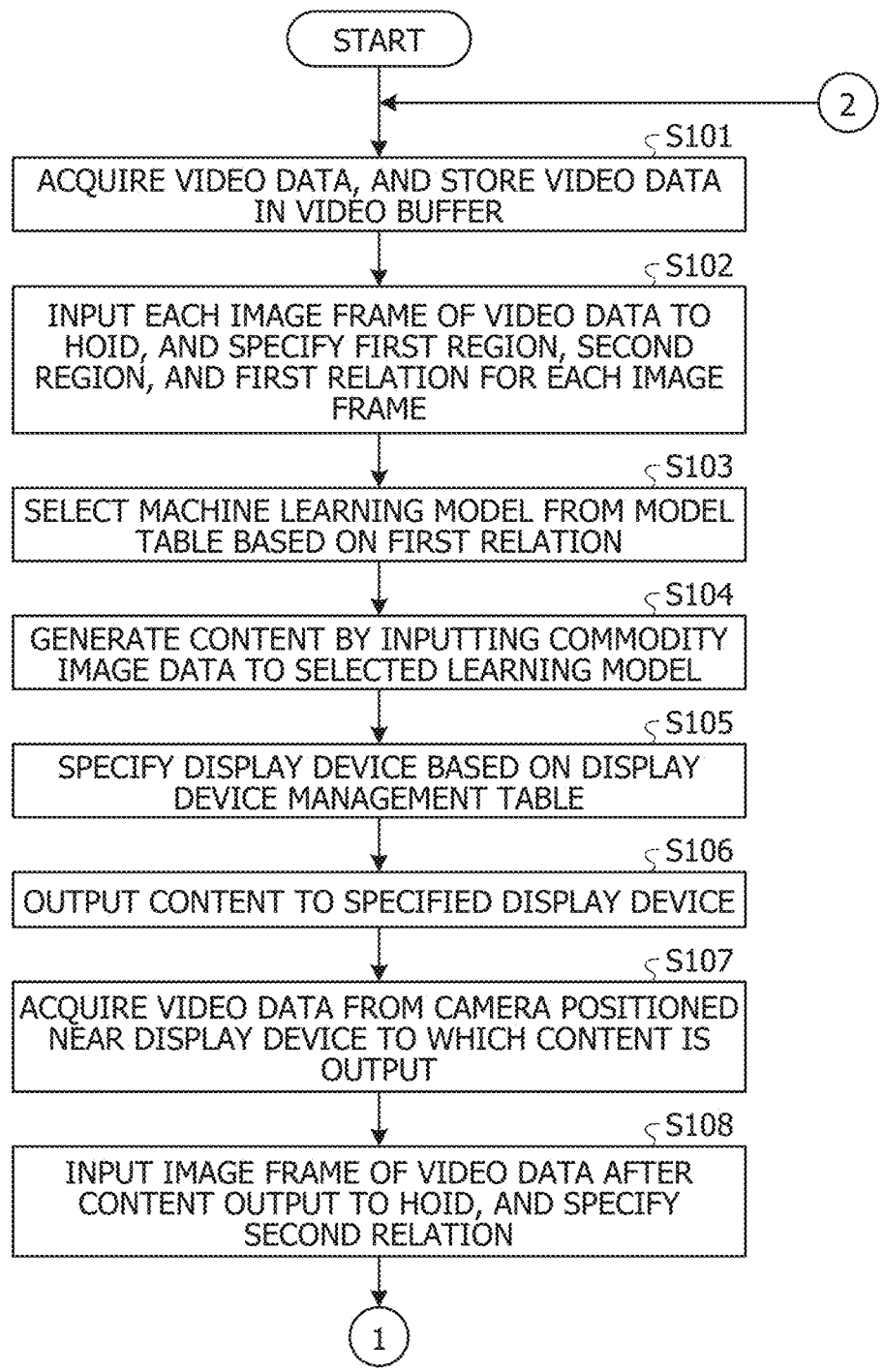
FIG. 11 is a flowchart (part 1) illustrating a processing procedure of the information processing apparatus according to the present embodiment.
Figure 12:
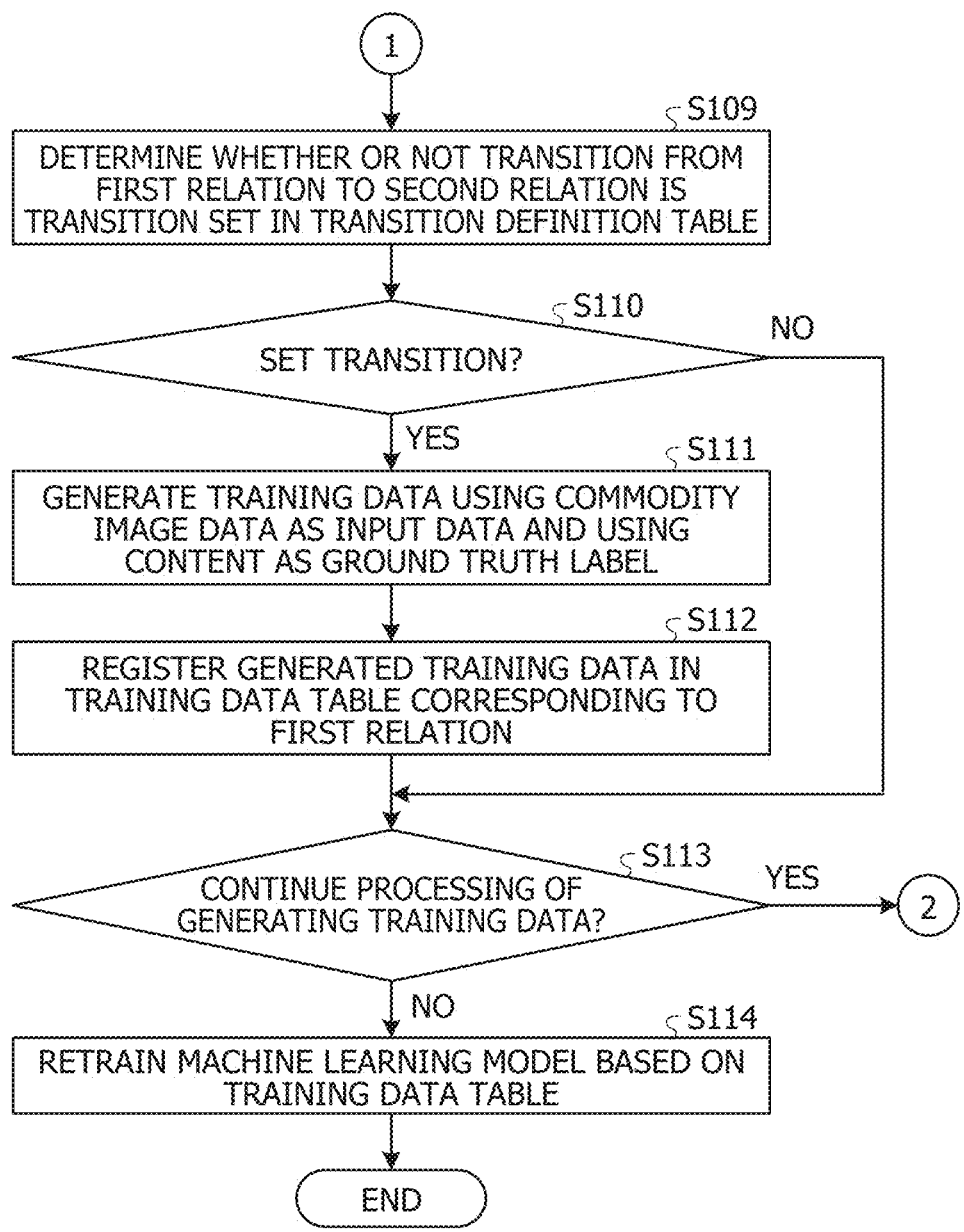
FIG. 12 is a flowchart (part 2) illustrating the processing procedure of the information processing apparatus according to the present embodiment.

Next, an example of a processing procedure of the information processing apparatus 100 according to the present embodiment will be described. FIGS. 11 and 12 are flowcharts illustrating the processing procedure of the information processing apparatus according to the present embodiment. In FIG. 11, the acquisition unit 151 of the information processing apparatus 100 acquires the video data and stores the video data in the video buffer 142 (step S101).

The generation unit 152 of the information processing apparatus 100 inputs each image frame of the video data to the HOID 141, and specifies the first region, the second region, and the first relation for each image frame (step S102). The generation unit 152 selects the machine learning model from the model table 143 based on the first relation (step S103).

The generation unit 152 generates the content by inputting the commodity image data to the selected learning model (step S104). The generation unit 152 specifies the display device 15 based on the display device management table 144 (step S105). The generation unit 152 outputs the generated content to the display device 15 (step S106).

The generation unit 152 acquires the video data from the camera 10 positioned near the display device 15 to which the content is output (step S107). The generation unit 152 inputs the image frame of the video data after the content output to the HOID, specifies the second relation (step S108), and proceeds to step S109 in FIG. 12.

Description continues with reference to FIG. 12. The generation unit 152 of the information processing apparatus 100 determines whether or not the transition from the first relation to the second relation is the transition set in the transition definition table 146 (step S109). In a case where the transition from the first relation to the second relation is not the set transition (No in step S110), the generation unit 152 proceeds to step S113.

In a case where the transition from the first relation to the second relation is the set transition (Yes in step S110), the generation unit 152 proceeds to step S111. The generation unit 152 generates the training data using the commodity image data as the input data and using the content as the ground truth label (step S111).

The generation unit 152 registers the generated training data in the training data table corresponding to the first relation (step S112).

In a case where the processing of generating the training data is continued (Yes in step S113), the generation unit 152 proceeds to step S101 in FIG. 11. On the other hand, in a case where the processing of generating the training data is not continued (No in step S113), the generation unit 152 proceeds to step S114.

The learning processing unit 153 of the information processing apparatus 100 retrains the machine learning model based on the training data table (step S114).

Next, effects of the information processing apparatus 100 according to the present embodiment are described. The information processing apparatus 100 specifies the first relation by analyzing the video data of the inside of the store, and causes the display device 15 to display the content obtained by inputting the commodity image data to the selected learning model that corresponds to the first relation. The information processing apparatus 100 specifies the second relation by analyzing the video data after the content output, and retrains the selected learning model, based on the transition from the first relation to the second relation, the content, and the commodity image data.

For example, in a case where the transition from the first relation to the second relation is the transition for increasing the customer's willingness to purchase, the content output when the commodity image data is input to the selected learning model is an appropriate content for increasing the customer's willingness to purchase. Thus, the selected learning model is retrained by the training data using the commodity image data as the input data and using the content as the ground truth label, and thus, the machine learning model capable of generating the information on the commodity effective for the customer may be obtained. The first relation corresponds to the first action, and the second relation corresponds to the second action.

The information processing apparatus 100 specifies the first relation, selects the machine learning model (selected learning model) that corresponds to the specified first relation, inputs the image data of the commodity to the selected learning model to generate the content, and causes the display device 15 to display the generated content. Accordingly, the content may be generated by the machine learning model suitable for the first relation, and the customer's willingness to purchase may be stimulated.

The information processing apparatus 100 specifies the first region that includes a person, the second region that includes a commodity, and the relation between the first region and the second region by inputting the video data (time-series image frames) to the HOID 141. Accordingly, the machine learning model in accordance with the relation of the person may be selected.

Although a case where the information processing apparatus 100 according to the present embodiment specifies the first region of the person, the second region of the commodity, and the relation by using the HOID 141 has been described, the disclosure is not limited thereto. The scene graph described with reference to FIG. 6 is generated, and thus, the information processing apparatus 100 may specify the first region of the person, the second region of the commodity, and the relation. As a related technique, it is considered that Bboxes that surround the region including the object and the region including the person in a rectangular shape from the video are extracted by using the machine learning model and the action of the person is identified based on a positional relation between both of the Bboxes. However, in the related technique, since the positional relation between the Bboxes extracted from the video is based on a two-dimensional space, for example, a depth between the Bboxes may not be analyzed. Accordingly, in the related technique, the action of the person may not be identified. By contrast, the information processing apparatus 100 according to the present embodiment may identify the action of the person by specifying the first region of the person, the second region of the commodity, and the relation.

Figure 13:
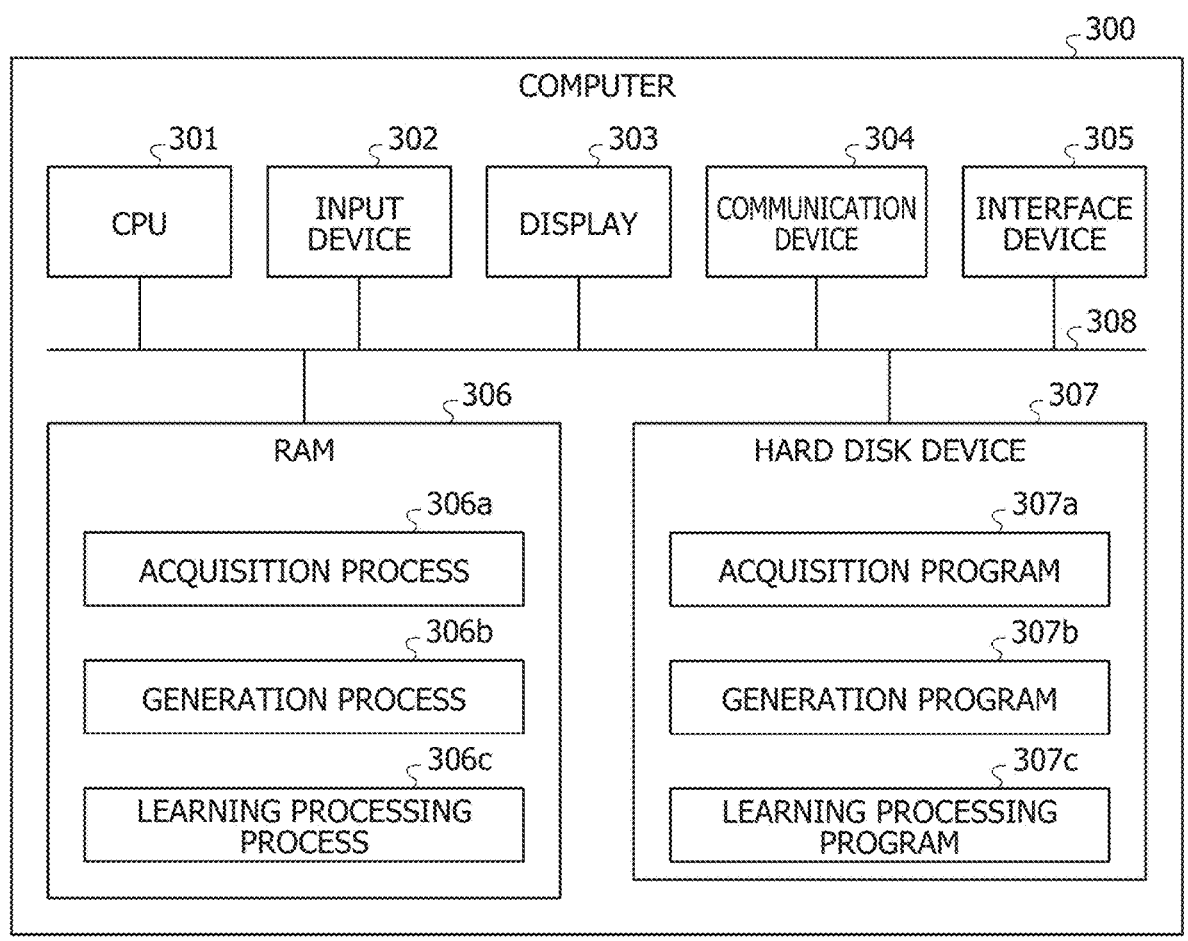
FIG. 13 is a diagram illustrating an example of a hardware configuration of a computer that realizes functions similar to functions of the information processing apparatus according to the embodiment.

Next, an example of a hardware configuration of a computer that realizes the functions similar to the functions of the above-described information processing apparatus 100 will be described. FIG. 13 is a diagram illustrating an example of the hardware configuration of the computer that realizes the functions similar to the functions of the information processing apparatus according to the embodiment.

As illustrated in FIG. 13, a computer 300 includes a CPU 301 that executes various kinds of arithmetic operation processing, an input device 302 that receives input of data from a user, and a display 303. The computer 300 also includes a communication device 304 that exchanges data with an external device or the like via a wired or wireless network, and an interface device 305. The computer 300 also includes a random access memory (RAM) 306 that temporarily stores various kinds of information and a hard disk device 307. Each of the devices 301 to 307 is coupled to a bus 308.

The hard disk device 307 includes an acquisition program 307a, a generation program 307b, and a learning processing program 307c. The CPU 301 reads each of the programs 307a to 307c and loads the program into the RAM 306.

The acquisition program 307a functions as an acquisition process 306a. The generation program 307b functions as a generation process 306b. The learning processing program 307c functions as a learning processing process 306c.

Processing of the acquisition process 306a corresponds to the processing of the acquisition unit 151. Processing of the generation process 306b corresponds to the processing of the generation unit 152. Processing of the learning processing process 306c corresponds to the processing of the learning processing unit 153.

Each of the programs 307a to 307c may not be stored in the hard disk device 307 from the beginning. For example, each of the programs 307a to 307c may be stored in a "portable physical medium" such as a flexible disk (FD), a compact disc read only memory (CD-ROM), a Digital Versatile Disc (DVD), a magneto-optical disk, an integrated circuit (IC) card, or the like inserted in the computer 300. The computer 300 may read and execute each of the programs 307*a* to 307*c*.

The following appendices are further disclosed with respect to embodiment modes including each embodiment described above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information processing program for causing a computer to execute processing comprising:
   acquiring a first video obtained by capturing an inside of a store by a first camera being any camera among a plurality of cameras disposed within the store;
   identifying a first action of a person on a commodity disposed within the store by analyzing the acquired first video;
   generating an advertisement content of the commodity by inputting the first video to a machine learning model;
   outputting the generated advertisement content to a first display device disposed within the store, to cause the first display device to display the generated advertisement content, the first display device being a display device corresponding to the first camera among a plurality of display devices disposed within the store;
   acquiring a second video obtained by capturing the inside of the store by the first camera after the generated advertisement content is displayed on the first display device;
   identifying a second action of the person on the commodity by analyzing the second video; and
   retraining the machine learning model, based on a transition from the first action to the second action, the generated content, and an image of the commodity as a target of the identified second action.

2. The non-transitory computer-readable recording medium according to claim 1, the processing further comprising:
   specifying the machine learning model based on the identified first action of the person, wherein
   the generating of the advertisement content includes generating the advertisement content of the commodity by inputting the first video to the machine learning model specified in the specifying of the machine learning model, and
   the retraining of the machine learning model includes retraining the machine learning model specified in the specifying of the machine learning model.

3. The non-transitory computer-readable recording medium according to claim 2, wherein
   the analyzing of the first video includes specifying, from the first video, a first region that includes the person, a second region that includes the commodity, and a relation that identifies an interaction between the person and the commodity, and
   the specifying of the machine learning model includes specifying, based on the relation from among a plurality of machine learning models, a machine learning model related to the commodity.

4. The non-transitory computer-readable recording medium according to claim 3, wherein
   the specifying of the machine learning model includes specifying, with reference to a storage device in which the relation and a plurality of machine learning models that have learned commodity information are associated with each other, a machine learning model that corresponds to the specified relation, from among the plurality of machine learning models,
   the generating of the advertisement content includes generating the advertisement content related to the commodity information by inputting an image of the commodity as a target of the identified first action to the specified machine learning model, and
   the processing further comprises transmitting a signal to cause a terminal used by the person to display the advertisement content related to the specified commodity information on a display device of the terminal so as to be viewable by the person.

5. An information processing method implemented by a computer, the information processing method comprising:
   acquiring a first video obtained by capturing an inside of a store by a first camera being any camera among a plurality of cameras disposed within the store;
   identifying a first action of a person on a commodity disposed within the store by analyzing the acquired first video;
   generating an advertisement content of the commodity by inputting the first video to a machine learning model;
   outputting the generated advertisement content to a first display device disposed within the store, to cause the first display device to display the generated advertisement content, the first display device being a display device corresponding to the first camera among a plurality of display devices disposed within the store;
   acquiring a second video obtained by capturing the inside of the store by the first camera after the generated advertisement content is displayed on the first display device;
   identifying a second action of the person on the commodity by analyzing the second video; and
   retraining the machine learning model, based on a transition from the first action to the second action, the generated content, and an image of the commodity as a target of the identified second action.

6. An information processing apparatus comprising:
   a memory; and
   a processor coupled to the memory, the processor being configured to perform processing comprising:
   acquiring a first video obtained by capturing an inside of a store by a first camera being any camera among a plurality of cameras disposed within the store;
   identifying a first action of a person on a commodity disposed within the store by analyzing the acquired first video;
   generating an advertisement content of the commodity by inputting the first video to a machine learning model;
   outputting the generated advertisement content to a first display device disposed within the store, to cause the first display device to display the generated advertisement content, the first display device being a display device corresponding to the first camera among a plurality of display devices disposed within the store;

acquiring a second video obtained by capturing the inside of the store by the first camera after the generated advertisement content is displayed on the first display device;

identifying a second action of the person on the commodity by analyzing the second video; and retraining the machine learning model, based on a transition from the first action to the second action, the generated content, and an image of the commodity as a target of the identified second action.

\* \* \* \* \*